(12) United States Patent
Garcia et al.

(10) Patent No.: US 8,714,628 B1
(45) Date of Patent: May 6, 2014

(54) TRUCK BED WEIGHTING SYSTEM

(76) Inventors: Juan A. Garcia, Itasca, IL (US); Carrie M. Cunningham, Schaumburg, IL (US)

( * ) Notice: Subject to any disclaimer, the term of this patent is extended or adjusted under 35 U.S.C. 154(b) by 0 days.

(21) Appl. No.: 13/553,663

(22) Filed: Jul. 19, 2012

(51) Int. Cl.
*B60P 7/08* (2006.01)
*B60P 1/00* (2006.01)

(52) U.S. Cl.
USPC .............. 296/183.1; 296/37.9; 296/100.1; 410/106; 414/532

(58) Field of Classification Search
USPC ............ 296/183.1, 39.2, 37.6; 410/110, 115, 410/80; 280/759, 757
See application file for complete search history.

(56) References Cited

U.S. PATENT DOCUMENTS

| | | | |
|---|---|---|---|
| 4,618,308 A * | 10/1986 | Ballard | 414/532 |
| 4,796,914 A * | 1/1989 | Raynor | 280/757 |
| 4,936,724 A * | 6/1990 | Dutton | 410/110 |
| 4,979,776 A * | 12/1990 | Schweickert | 296/100.15 |
| 6,390,744 B1 * | 5/2002 | Parkins | 410/106 |
| 6,887,021 B1 * | 5/2005 | Herring | 410/102 |
| 7,048,277 B1 * | 5/2006 | Schmeichel | 296/100.16 |
| 7,461,823 B2 * | 12/2008 | Decker et al. | 248/273 |
| 2007/0018444 A1 * | 1/2007 | Gibson | 280/759 |
| 2009/0243331 A1 * | 10/2009 | Spencer et al. | 296/100.01 |

* cited by examiner

*Primary Examiner* — Glenn Dayoan
*Assistant Examiner* — Sunsurraye Westbrook
(74) *Attorney, Agent, or Firm* — Dillis V. Allen, Esq.

(57) ABSTRACT

A truck bed weighting system that does not interfere with the use of the bed for entry, exit or storage including an elongated canvas-like carrier mounted by loops to tie-down points on the bed side walls so the carrier sits longitudinally in the bed against the side walls. This carrier is designed to receive and hold a plurality of standard sand or other particulate sacks; e.g., 26" or 31".
A line of three canvases are provided in 70", 78" and 96" lengths to accommodate the many varieties of truck bed lengths.
In the off season, these carriers can be emptied of the sacks and utilized to store tools or other items in an out of the way position.

10 Claims, 3 Drawing Sheets

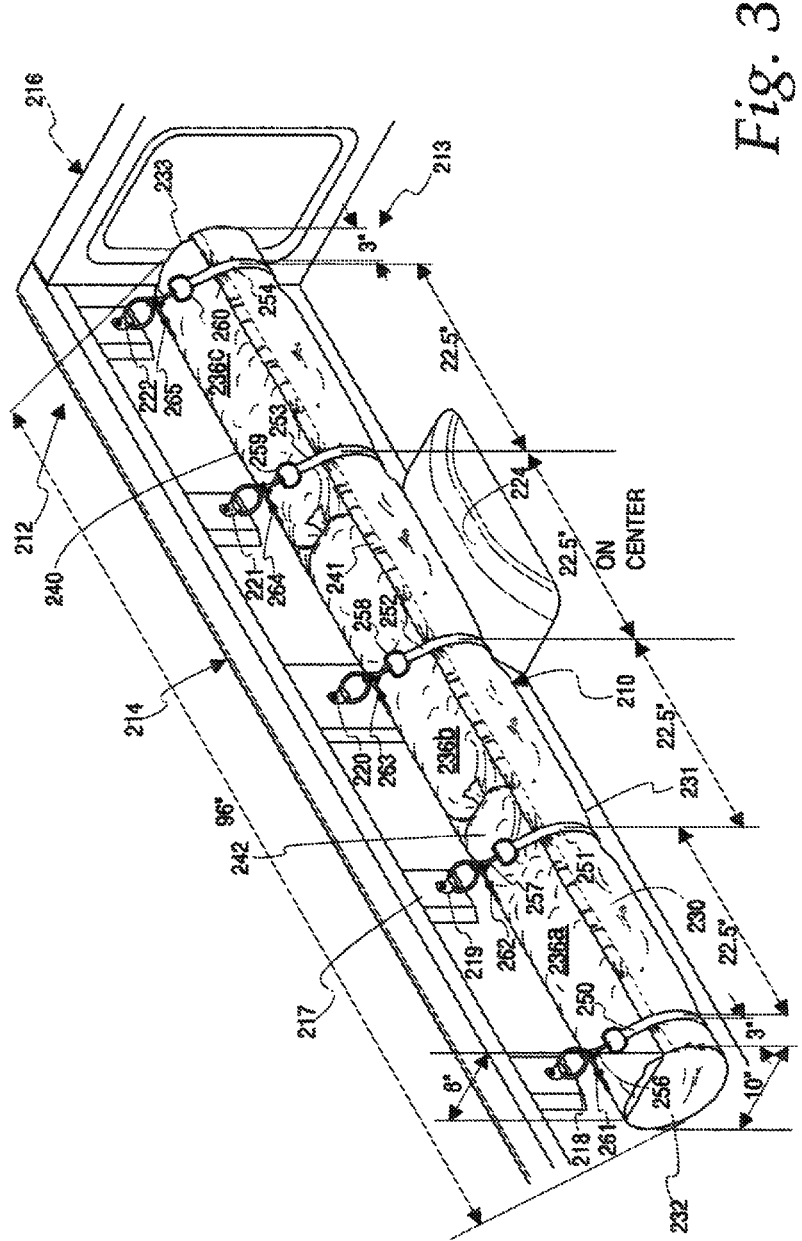

TRUCK BED WEIGHTING SYSTEM

BACKGROUND OF THE PRESENT INVENTION

Many pick-ups and cargo vehicles have poor traction over many surfaces because of rear wheel only drive systems, weight distribution and other reasons, necessitating the user to add weights in some fashion in or near the truck bed or even on the rear drive wheels. Except for the wheel mounted weighting systems, the prior weighting arrangements take up too much bed space, impede ingress and egress to the bed and are cumbersome to use.

The following patents were uncovered in a preliminary patent search on this product:

| Inventor | Pat. No. | Issue Date |
|---|---|---|
| Raynor | 4,796,914 | Jan. 10, 1989 |
| Heltenburg | 5,494,315 | Feb. 27, 1996 |
| Hall | 5,897,138 | Apr. 27, 1999 |
| Desmarais | 6,283,527 | Sep. 4, 2001 |
| Watkins | 7,523,961 | Apr. 28, 2009 |
| Kokladas | 7,717,486 | May 18, 2010 |

UNITED STATES PATENT APPLICATION PUBLICATIONS

Gibson Pub. No. US 2007/0018444 Pub. Date: Jan. 25, 2007
Clements Pub. No. US 2008/0309059 Pub. Date: Dec. 18, 2008

The Raynor, U.S. Pat. No. 4,796,914, shows a liquid based ballast system that appears to encompass the entire floor panel.

The Heltenburg, U.S. Pat. No. 5,494,315, shows a wheel well sand containing structure over each of the rear wheel wells.

It is a primary object of the present invention to ameliorate the problems noted above in truck bed weighting systems.

SUMMARY OF THE PRESENT INVENTION

In accordance with the present invention, a truck bed weighting system is provided that does not interfere with the use of the bed for entry, exit or storage including an elongated canvas-like carrier mounted by loops to the down points on the bed side walls so the carrier sits longitudinally in the bed against the side walls. This carrier is designed to receive and hold a plurality of standard sand or other particulate sacks; e.g., 26" or 31".

A line of three canvases are provided in 70", 78" and 96" lengths to accommodate the many varieties of truck bed lengths.

In the off season, these carriers can be emptied of the sacks and utilized to store tools or other items in an out of the way position.

Another advantage in this weighting system is that it can be packaged, shipped and displayed in small poly bags.

A further advantage of the present invention is that it uses OEM anchor points already installed in the truck bed side walls.

A further advantage of the present invention is that the carrier in an empty condition, can be installed in the truck bed and thereafter loaded with the weight sacks, so the user only has to handle at one time, the weight of only one sack, rather than two or three if the sacks are loaded into the carrier prior to loading and attaching the carrier into the bed side wall.

A further advantage of the present carrier is because of its flexibility and because it carries more than one weight sack, it can be draped over the wheel cover if the wheel cover projects upwardly a sufficient distance.

Other objects and advantages of the present invention will appear more clearly from the following detailed description.

BRIEF DESCRIPTION OF THE DRAWINGS

FIG. 3 is a 96" version of the present truck bed weighting system shown installed in a longer truck bed.

DETAILED DESCRIPTION OF THE PREFERRED EMBODIMENTS

Figure 1:
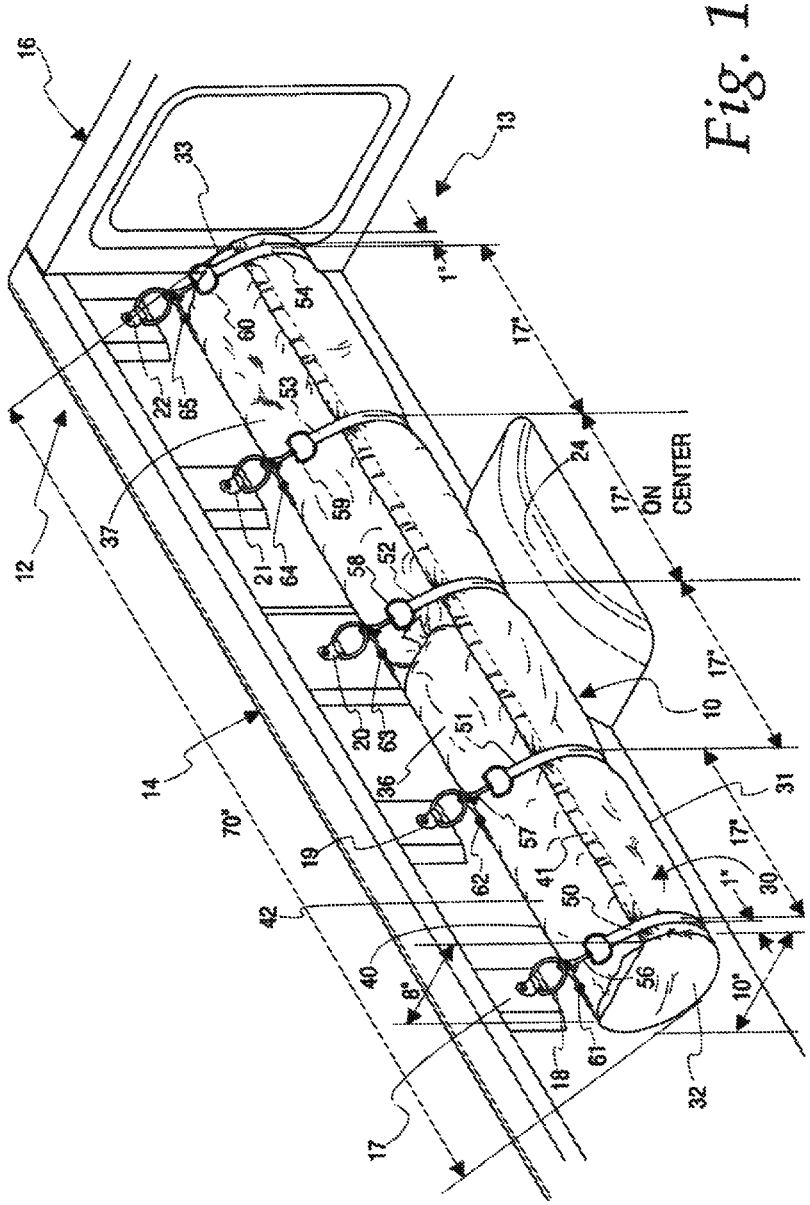
FIG. 1 is a perspective view of the 70" version of the present truck bed weighting system shown in a fragmented truck bed.

Viewing FIG. 1, a 70 inch version of the present truck bed weighting system is illustrated designated generally with the reference number 10 shown installed into an exemplary fragmented short truck bed 12 including a bottom platform panel 13, a side wall panel 14, and a rear gate panel 16. The truck side wall panel 14 includes a plurality of vertical struts 17 defining supports for anchor hook assemblies 18, 19, 20, 21, and 22 that are OEM installed anchor points. It should be understood, however, that the anchor points or hook assemblies 18, 19, 20, 21 and 22 could also be a user-installed item. The floor 13 of the bed also includes a conventional wheel cover 24 that projects upwardly from the floor platform panel 13 adjacent the side wall assembly 14. Of course, it should be understood that the representation in FIG. 1 of the truck bed weighting system 10 shown in the right side of the truck bed, that a similar assembly would be mounted typically on the left side of the truck bed.

The truck bed weighting system 10 as shown in FIG. 1, includes a semi-cylindrical carrier assembly 30 consisting of canvas portion 31 that is 70" in axial length and canvas end caps 32 and 33 sewn onto the ends thereof to enclose a cylindrical shape into which particulate weighting sacks 36 and 37 are inserted after the installation of the carrier assembly 30 into the truck bed 12.

The cylindrical portion 31 is hemmed at 40 and 41 leaving an opening 42 approximately 8 inches in width as designated in the drawings. The exemplary canvas for the semi-cylindrical portion 31 and the end caps 32 and 33 is 12-14 oz. minimum weight canvas.

The carrier assembly 30 is held in position in the truck bed by five polypropylene straps 50, 51, 52, 53 and 54, each having end loops to which 3-3½ inch heavy duty spring bolt snaps 56, 57, 58, 59 and 60 are attached. Similar snaps 61, 62, 63, 64 and 65 are attached to the other end of the straps 50, 51, 52, 53 and 54. The snaps 56 to 60 and 61 to 65 are attached by the user to the anchors 18, 19, 20, 21 and 22 respectively to hold the carrier assembly 30 in position.

After the carrier assembly 30 is attached in an empty condition into the truck bed 12 utilizing the tie-down anchors 18, 19, 20, 21 and 22. Note that the straps 50, 51, 52, 53 and 54 are spaced 17 inches apart and that the end straps 50 and 54 are spaced 1 inch inside the end caps 32 and 33.

After assembly and attachment of the carrier assembly 30 into the bed of the truck, particulate sacks 36 and 37 are placed inside the opening 42 in the carrier assembly 30 and slid to the appropriate positions shown in FIG. 1 extending substantially the entire length of the carrier assembly 30. The particulate sacks 36 and 37 are each 31 inches in length and 70 lbs. each resulting in a total added weight of 140 lbs. to the truck bed weighting system 10. The straps 50 to 54 are preferably one inch wide with polypropylene webbing with a minimum 600 lb. strength, attached with a 120 lb. weight polyester thread. Of course, the specific construction of the straps is only exemplary and other straps could, of course, be substituted. And furthermore, while the carrier 30 is depicted as being a canvas material, it could be an elastomeric material as well, although it would preferably be woven.

Figure 2:
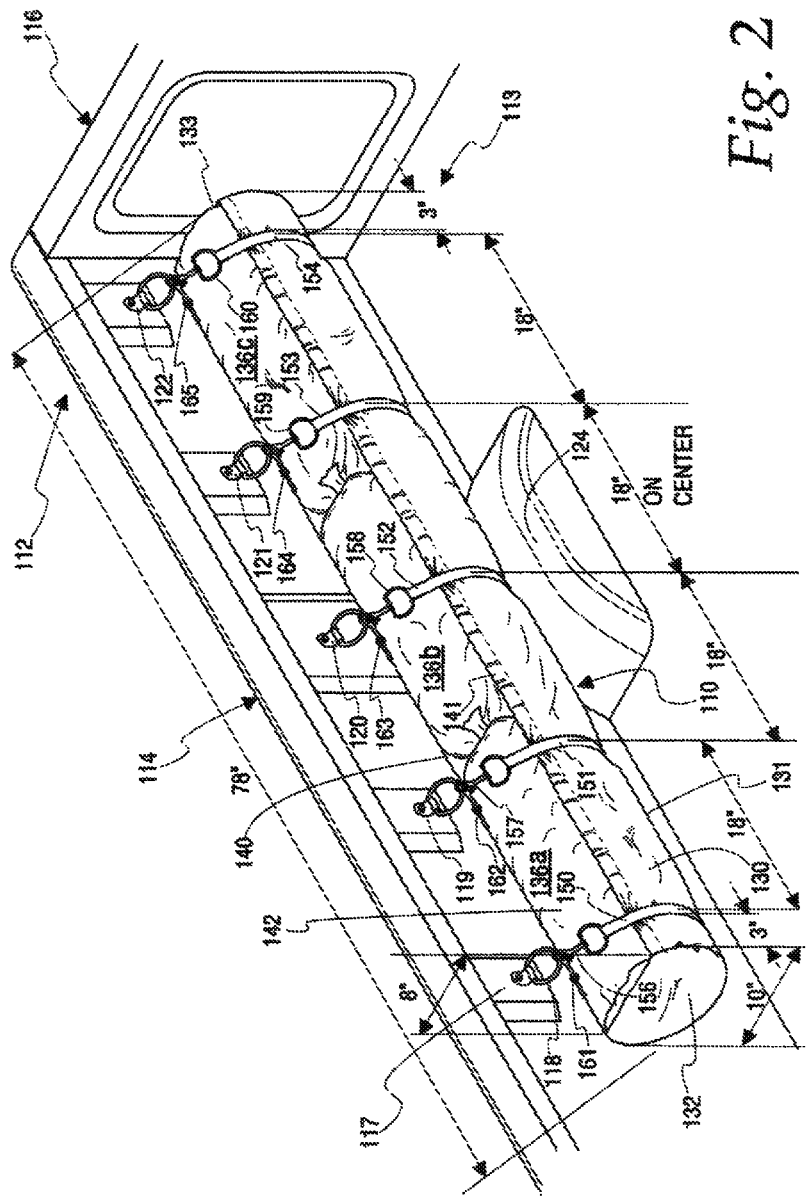
FIG. 2 is a 78" version of the present truck bed weighting system shown installed in a fragmented truck bed similar to the FIG. 1 depiction.

Referring now to FIG. 2, a second embodiment of the present invention is illustrated in which a truck bed weighting system 110 is illustrated having a length of 78 inches and a diameter of 10 inches, the diameter being the same as in the FIG. 1 embodiment. In the FIG. 2 embodiment, the carrier 130 is designed to hold three 26 inch 60 lb. particulate sacks totaling 180 lbs. The present truck bed weighting system is illustrated designated generally with the reference number 110 shown installed into an exemplary fragmented short truck bed 112 including a bottom platform panel 113, a side wall panel 114, and a rear gate panel 116. The truck side panel 114 includes a plurality of vertical struts 117 defining supports for anchor hook assemblies 118, 119, 120, 121, and 122 that are OEM installed anchor points. It should be understood, however, that the anchor points or hook assemblies 118, 119, 120, 121 and 122 could also be a user-installed item. The floor 113 of the bed also includes a conventional wheel cover 124 that projects upwardly from the floor platform 113 adjacent the side wall assembly 114. Of course, it should be understood that the representation in FIG. 2 of the truck bed weighting system 110 shown in the right side of the truck bed, that a similar assembly would be mounted typically on the left side of the truck bed.

The truck bed weighting system 110 as shown in FIG. 2, includes a semi-cylindrical canvas portion 131 that is 78 inches in axial length and canvas end caps 132 and 133 sewn onto the ends thereof to enclose a cylindrical shape into which particulate weighting sacks 136a, 136b and 136c are inserted after the installation of the carrier assembly 130 into the truck bed 112. The carrier assembly 130 includes a semi-cylindrical canvas portion 131 with end caps 132 and 133.

The cylindrical portion 131 is hemmed at 140 and 141 leaving an opening 142 approximately 8 inches in width as designated in the drawings. The exemplary canvas for the semi-cylindrical portion 131 and the end caps 132 and 133 is 12-14 oz. minimum weight canvas.

The carrier assembly 130 is held in position in the truck bed by five polypropylene straps 150, 151, 152, 153 and 154, each having end loops to which 3-3½ inch heavy duty spring bolt snaps 156, 157, 158, 159 and 160 are attached. Similar snaps 161, 162, 163, 164 and 165 are attached to the other end of the straps 150, 151, 152, 153 and 154. The snaps 156 to 160 and 161 to 165 are attached to the anchors 118, 119, 120, 121 and 122 respectively to hold the carrier assembly 130 in position.

After the carrier assembly 130 is attached in an empty condition into the truck bed 112 utilizing the tie-down anchors 118, 119, 120, 121 and 122. Note that the straps 150, 151, 152, 153 and 154 are spaced 18 inches apart and that the end straps 150 and 154 are spaced 3 inches inside the end caps 132 and 133.

After assembly and attachment of the carrier assembly 130 into the bed of the truck, particulate sacks 136a, 136b and 136c are placed inside the opening 142 in the carrier assembly 130 and slid to the appropriate positions shown in FIG. 2 extending substantially the entire length of the carrier assembly 130. The particulate sacks 136a, 136b and 136c are each 26 inches in length and 60 lbs. each resulting in a total added weight of 180 lbs. to the truck bed weighting system 110. The straps 150 to 154 are preferably one inch wide with polypropylene webbing with a minimum 600 lb. strength, attached with a 120 lb. weight polyester thread. Of course, the specific construction of the straps is only exemplary and other straps could, of course, be substituted. And furthermore, while the carrier 130 is depicted as being a canvas material, it could be an elastomeric material as well, although it would preferably be woven.

Referring to FIG. 3, a third embodiment of the present invention is illustrated depicting a truck bed weighting system 210 having a length of 96 inches, a diameter of 10 inches that is designed to hold three 31 inch standard particulate sacks each weighing 70 lbs. for a total added weight of 210 lbs. The present truck bed weighting system is illustrated designated generally with the reference number 210 shown installed into an exemplary fragmented short truck bed 212 including a bottom platform panel 213, a side wall panel 214, and a rear gate panel 216. The truck side panel 214 includes a plurality of vertical struts 217 defining supports for anchor hook assemblies 218, 219, 220, 221, and 222 that are OEM installed anchor points. It should be understood, however, that the anchor points or hook assemblies 218, 219, 220, 221 and 222 could also be a user-installed item. The floor 213 of the bed also includes a conventional wheel cover 224 that projects upwardly from the floor platform 213 adjacent the side wall assembly 214. Of course, it should be understood that the representation in FIG. 3 of the truck bed weighting system 210 shown in the right side of the truck bed, that a similar assembly would be mounted typically on the left side of the truck bed.

The truck bed weighting system 210 as shown in FIG. 3, includes a semi-cylindrical canvas portion 231 that is 96 inches in axial length and canvas end caps 232 and 233 sewn onto the ends thereof to enclose a cylindrical shape into which particulate weighting sacks 236a, 236b and 236c are inserted after the installation of the carrier assembly 230 into the truck bed 212. The carrier assembly 230 includes a semi-cylindrical canvas portion 231 with end caps 232 and 233.

The cylindrical portion 231 is hemmed at 240 and 241 leaving an opening 242 approximately 8 inches in width as designated in the drawings. The exemplary canvas for the semi-cylindrical portion 231 and the end caps 232 and 233 is 12-14 oz. minimum weight canvas.

The carrier assembly 230 is held in position in the truck bed by five polypropylene straps 250, 251, 252, 253 and 254, each having end loops to which 3-3½ inch heavy duty spring bolt snaps 256, 257, 258, 259 and 260 are attached. Similar snaps 261, 262, 263, 264 and 265 are attached to the other end of the straps 250, 251, 252, 253 and 254. The snaps 256 to 260 and 261 to 265 are attached to the anchors 218, 219, 220, 221 and 222 respectively to hold the carrier assembly 130 in position.

After the carrier assembly 230 is attached in an empty condition into the truck bed 212 utilizing the tie-down anchors 218, 219, 220, 221 and 222. Note that the straps 250, 251, 252, 253 and 254 are spaced 22.5 inches apart and that the end straps 250 and 254 are spaced 3 inches inside the end caps 232 and 233.

After assembly and attachment of the carrier assembly 230 into the bed of the truck, particulate sacks 236a, 236b and 236c are placed inside the opening 242 in the carrier assembly 230 and slid to the appropriate positions shown in FIG. 3 extending substantially the entire length of the carrier assembly 230. The particulate sacks 236a, 236b and 236c are each 31 inches in length and 70 lbs. resulting in a total added weight of 210 lbs. to the truck bed weighting system 210. The straps 250 to 254 are preferably one inch wide with polypropylene webbing with a minimum 600 lb. strength, attached with a 120 lb. weight polyester thread. Of course, the specific construction of the straps is only exemplary and other straps could, of course, be substituted. And furthermore, while the carrier 230 is depicted as being a canvas material, it could be an elastomeric material as well, although it would preferably be woven.

The invention claimed is:

1. A removable truck bed weighting system for a truck bed having a longitudinal axis and a platform floor and adjacent side walls and inwardly projecting wheel wells, comprising: a first flexible elongated carrier adapted to be mounted on one side of the truck bed parallel to the longitudinal axis of the bed closely adjacent one of the bed side walls, said elongated carrier having a longitudinal opening therein adapted to receive at least one elongated weighting element, a plurality of brackets designed to be mounted on the side walls having straps engaging and holding the carrier, said carrier having a width less than 15 inches and a length over substantially 60 inches, and a second flexible elongated carrier adapted to be mounted on the other side of the truck bed parallel to the longitudinal axis of the bed closely adjacent one of the bed side walls, said elongated carrier having a longitudinal opening therein adapted to receive at least one elongated weighting element.

2. A removable truck bed weighting system for a truck bed as defined in claim 1, wherein the elongated carrier is constructed of a flexible material designed to drape over the side of the truck bed wheel wells.

3. A removable truck bed weighting system for a truck bed as defined in claim 1, including a plurality of straps around the elongated carrier each having two ends, a plurality of fasteners connected to the ends for attachment to the truck bed tie-down points.

4. A removable truck bed weighting system for a truck bed as defined in claim 1, wherein the elongated carrier is designed to receive a plurality of standard elongated particulate sacks.

5. A removable truck bed weighting system for a truck bed as defined in claim 1, wherein the elongated carrier has a diameter of about 10 inches and a length between approximately 70 and 96 inches.

6. A removable truck bed weighting system for a truck bed having a longitudinal axis and a platform floor and adjacent side walls and inwardly projecting wheel wells, comprising: a first flexible elongated carrier adapted to be mounted in the truck bed parallel to the longitudinal axis of the bed closely adjacent one of the bed side walls, said elongated carrier having a longitudinal opening therein adapted to receive at least one elongated weighting element, and a second flexible elongated carrier adapted to be mounted on the other side of the truck bed parallel to the longitudinal axis of the bed closely adjacent one of the bed side walls, said elongated carrier having a longitudinal opening therein adapted to receive at least one elongated weighting element wherein the elongated carriers are constructed of a flexible material adapted to drape over the side of the truck bed wheel wells, including a plurality of straps around the elongated carriers each having two ends, a plurality of fasteners connected to the ends for attachment to the truck bed tie-down points, wherein the elongated carriers are designed to receive a plurality of standard elongated particulate sacks.

7. A line of removable truck bed weighting systems for a truck bed having a longitudinal axis and a platform floor and adjacent side walls and inwardly projecting wheel wells, comprising: a plurality of sets of flexible elongated carriers having lengths between about 70 and 96 inches and diameters of about 10 inches each set adapted to be mounted parallel to the longitudinal axis of the bed in the truck bed closely adjacent each of the side walls, each of the carriers having a plurality of straps therearound for attachment to the tie down points of one of the bed side walls, each of the carriers having an opening therein for receiving a standard size elongated particulate sack, a plurality of brackets designed to be mounted on the side walls for holding the straps engaging and holding the carrier, said carrier having a width less than 15 inches and a length over substantially 60 inches.

8. A line of removable truck bed weighting systems for a truck bed as defined in claim 7, wherein the elongated carrier is constructed of a flexible material adapted to drape over the side of the truck bed wheel wells.

9. A line of removable truck bed weighting systems for a truck bed as defined in claim 7, including a plurality of straps around the elongated carrier each having two ends, a plurality of fasteners connected to the ends for attachment to the truck bed tie-down points.

10. A line of removable truck bed weighting systems for a truck bed as defined in claim 7, wherein the elongated carrier is designed to receive a plurality of standard elongated particulate sacks.

* * * * *